(12) United States Patent
Matsunaga et al.

(10) Patent No.: US 11,285,996 B2
(45) Date of Patent: Mar. 29, 2022

(54) PARKING ASSIST SYSTEM

(71) Applicant: TOYOTA JIDOSHA KABUSHIKI KAISHA, Toyota (JP)

(72) Inventors: Issei Matsunaga, Owariasahi (JP); Koji Taguchi, Sagamihara (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 196 days.

(21) Appl. No.: 16/524,676

(22) Filed: Jul. 29, 2019

(65) Prior Publication Data

US 2020/0031395 A1 Jan. 30, 2020

(30) Foreign Application Priority Data

Jul. 30, 2018 (JP) .............................. JP2018-142652

(51) Int. Cl.
| | |
|---|---|
| *B62D 15/02* | (2006.01) |
| *G05D 1/02* | (2020.01) |
| *B62D 6/00* | (2006.01) |
| *G08G 1/01* | (2006.01) |

(52) U.S. Cl.
CPC ......... *B62D 15/0285* (2013.01); *B62D 6/001* (2013.01); *B62D 15/028* (2013.01); *G05D 1/021* (2013.01); *G08G 1/0137* (2013.01); *G05D 2201/0213* (2013.01)

(58) Field of Classification Search
CPC .. B62D 15/0285; B62D 6/001; B62D 15/028; G05D 1/021; G05D 2201/0213; G05D 1/0061; G08G 1/0137
See application file for complete search history.

(56) References Cited

U.S. PATENT DOCUMENTS

| | | | | |
|---|---|---|---|---|
| 2008/0033640 | A1* | 2/2008 | Amano .............. | G01C 21/3476 701/414 |
| 2012/0161983 | A1* | 6/2012 | Yao .................... | B62D 15/0285 340/932.2 |
| 2017/0277182 | A1* | 9/2017 | May .................... | B60W 50/082 |

(Continued)

FOREIGN PATENT DOCUMENTS

| | | |
|---|---|---|
| JP | 2003-91798 A | 3/2003 |
| JP | 2013-241087 A | 12/2013 |

(Continued)

*Primary Examiner* — Aniss Chad
*Assistant Examiner* — Madison R Hughes
(74) *Attorney, Agent, or Firm* — Sughrue Mion, PLLC

(57) ABSTRACT

A parking assist system is provided with: a first estimator configured to estimate a first time, which is a time required for a parking control preliminary operation of manually moving a vehicle to a position in which the parking control can be started; a second estimator configured to estimate a second time, which is a time required for a manual parking operation of manually parking the vehicle in a parking space; a determinator configured to determine whether or not it is in a situation to perform the manual parking operation rather than the parking control preliminary operation, on the basis of the first time and the second time; and a proposing device configured to propose performing the manual parking operation to an occupant of the vehicle if it is determined that it is in the situation to perform the manual parking operation rather than the parking control preliminary operation.

4 Claims, 4 Drawing Sheets

(56) References Cited

U.S. PATENT DOCUMENTS

| | | | |
|---|---|---|---|
| 2017/0285654 A1 | 10/2017 | Nagai et al. | |
| 2018/0150773 A1* | 5/2018 | Lee | G06Q 10/02 |
| 2018/0236993 A1* | 8/2018 | Mielenz | B60W 10/20 |
| 2019/0039606 A1* | 2/2019 | Fujita | B60R 21/00 |
| 2019/0180618 A1* | 6/2019 | Nordbruch | G08G 1/14 |

FOREIGN PATENT DOCUMENTS

| | | |
|---|---|---|
| JP | 2016-215793 A | 12/2016 |
| JP | 2017-182263 A | 10/2017 |

* cited by examiner

PARKING ASSIST SYSTEM

CROSS-REFERENCE TO RELATED APPLICATIONS

This application is based upon and claims the benefit of priority of the prior Japanese Patent Application No. 2018-142652, filed on Jul. 30, 2018, the entire contents of which are incorporated herein by reference.

BACKGROUND

1. Technical Field

Embodiments of the present disclosure relate to a parking assist system configured to assist the parking of a vehicle.

2. Description of the Related Art

For this type of system, there is known a system configured to perform a control for automatically parking a vehicle in a parking space (so-called automated valet parking). For example, Japanese Patent Application Laid Open No. 2017-182263 (Patent Literature 1) discloses a technology/technique of searching for a parking space as similar as possible to a user's condition and of automatically parking a vehicle in the parking space. Japanese Patent Application Laid Open No. 2013-241087 (Patent Literature 2) discloses a technology/technique of calculating and displaying a time required from the start to completion of the parking, from a route from the start to completion of the parking and from a vehicle speed pattern in the route.

In addition, Japanese Patent Application Laid Open No. 2016-215793 (Patent Literature 3) discloses a technology/technique of proposing switching from autonomous or automated driving to manual driving if a driver feels a lot of anxiety about the autonomous or automated driving.

In the automated valet parking, a control for parking a vehicle from a predetermined start position is automatically performed. Thus, an occupant of the vehicle can end a driving operation at a relatively early stage. In other words, there is a tendency that the automated valet parking can further reduce a driving time in comparison with manual parking, which requires the driving operation until the parking is completed.

The automated valet parking, however, may require a relatively long time to move the vehicle to the predetermined start position in some cases. For example, if it is crowded with vehicles that are about to perform the automated valet parking, a waiting time likely becomes long. In this situation, there is a possibility that the parking can be completed more quickly by selecting the manual parking, than by selecting the automated valet parking. In other words, in some cases, avoiding congestion in the automated valet parking and manually parking the vehicle from another route can result in an early end of the driving operation.

However, even in a situation in which both the automated valet parking and the manual parking can be selected, it is hard for the occupant of the vehicle to select an appropriate parking operation while accurately determining the time required for the parking.

SUMMARY

In view of the aforementioned problems, it is therefore an object of embodiments of the present disclosure to provide a parking assist system in which the occupant of the vehicle can select the appropriate parking operation.

An aspect of the parking assist system according to the present disclosure is a parking assist system configured to perform a parking control for automatically parking a vehicle, the parking assist system provided with: a first estimator configured to estimate a first time, which is a time required for a parking control preliminary operation of manually moving the vehicle to a position in one parking lot in which the parking control can be started; a second estimator configured to estimate a second time, which is a time required for a manual parking operation of manually parking the vehicle in a parking space in the one parking lot or in another parking lot, without allowing the parking control to be performed; a determinator configured to determine whether or not it is in a situation to perform the manual parking operation rather than the parking control preliminary operation, on the basis of the first time and the second time; and a proposing device configured to propose performing the manual parking operation to an occupant of the vehicle if it is determined that it is in the situation to perform the manual parking operation rather than the parking control preliminary operation.

DETAILED DESCRIPTION OF THE EMBODIMENT

Hereinafter, a parking assist system according to an embodiment of the present disclosure will be explained with reference to the drawings.

<System Configuration>

Figure 1:
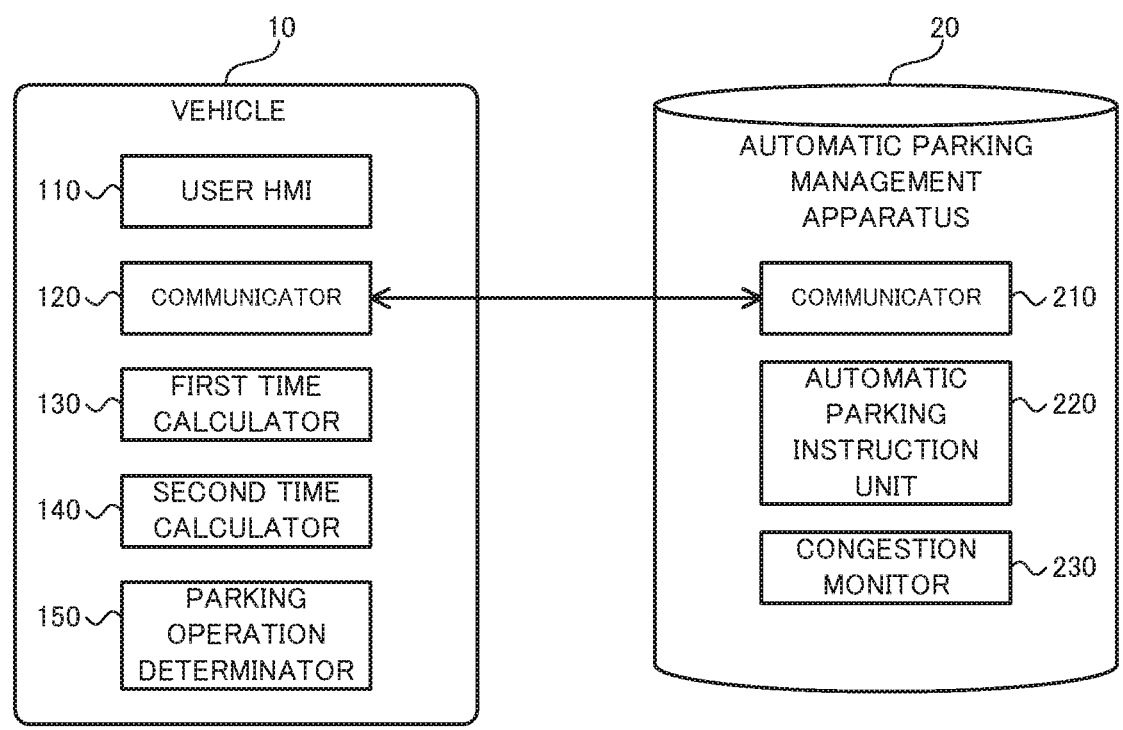
FIG. 1 is a block diagram illustrating a configuration of a parking assist system according to an embodiment.

Firstly, a configuration of the parking assist system according to the embodiment will be explained with reference to FIG. 1. FIG. 1 is a block diagram illustrating the configuration of the parking assist system according to the embodiment.

As illustrated in FIG. 1, parking assist system according to the embodiment is provided with a vehicle 10 and an automatic parking management apparatus 20, which are configured to communicate with each other.

The vehicle 10 is provided with a user human machine interface (HMI) 110, a communicator 120, a first time calculator 130, a second time calculator 140, and a parking operation determinator 150.

The user HMI 110 is configured to allow various information to be exchanged between the vehicle 10 and an occupant thereof, and may include, for example, a switch, a microphone, a speaker, a display, or the like. The user HMI 110 according to the embodiment is particularly configured to propose an appropriate parking operation to the user by using audio, video, or the like. In other words, the user HMI 110 may function as a specific example of the "proposing device" in Supplementary Notes described later. The user HMI 110 is also configured to input an automatic parking desired degree described later. In other words, the user HMI 110 may function as a specific example of the "first acquirer" in Supplementary Notes described later.

The communicator 120 is configured to input/output various information by wirelessly communicating with the automatic parking management apparatus 20 (i.e., a communicator 210). The information obtained by the communicator 120 from the automatic parking management apparatus 20 may be outputted to each of the first time calculator 130 and the second time calculator 140.

The first time calculator 130 is configured to calculate (or estimate) a time required to allow the vehicle 10 to start automated valet parking (hereinafter referred to as an "automatic parking time" as occasion demands). The automatic parking time may be a time required to allow the vehicle 10 to move from a current position to a start position of the automated valet parking. The first time calculator 130 is configured to calculate the automatic parking time, for example, on the basis of a distance to the start position of the automated valet parking, a speed of the vehicle 10, the information received from the automatic parking management apparatus 20, or the like. Information indicating the automatic parking time calculated by the first time calculator 130 may be outputted to the parking operation determinator 150. The first time calculator 130 and the automatic parking time are respectively specific examples of the "first estimator" and the "first time" in Supplementary Notes described later.

The second time calculator 140 is configured to calculate a time required to allow the vehicle 10 to be manually parked in a parking space (hereinafter referred to as a "manual parking time" as occasion demands). The second time calculator 140 is configured to calculate the manual parking time, for example, on the basis of a distance to the parking space that allows manual parking, the speed of the vehicle 10, the information received from the automatic parking management apparatus 20, or the like. Information indicating the manual parking time calculated by the second time calculator 140 may be outputted to the parking operation determinator 150. The second time calculator 140 and the manual parking time are respectively specific examples of the "second estimator" and the "second time" in Supplementary Notes described later.

The automatic parking time calculated by the first time calculator 130 and the manual parking time calculated by the second time calculator 140 may include a time required for the occupant of the vehicle 10, who has ended a driving operation, to arrive at a predetermined destination (e.g., a facility near a parking lot that the occupant is schedule to visit, etc.) after getting off the vehicle 10. In other words, the automatic parking time and the manual parking time may include not only a time required for the occupant to end the driving operation of the vehicle 10, but also a transit time (e.g., a walking time, etc.) in which the vehicle 10 is not used after the end of the driving operation. The destination of the occupant at this time may be obtained, for example, from schedule information about the occupant.

The automatic parking time and the manual parking time may be calculated with them converted to their corresponding "distances". In this case, in the subsequent process, a determination is made by using distance instead of time. In this case, however, the substantial process content does not change.

The parking operation determinator 150 is configured to determine whether it is in a situation to perform the automated valet parking, or in a situation to perform the manual parking, by comparing the automatic parking time calculated by the first time calculator 130 and the manual parking time calculated by the second time calculator 140. For example, the parking operation determinator 150 may compare the automatic parking time and the manual parking time with each other, and may determine that it is a situation to perform the parking operation corresponding to the shorter parking time. In other words, if the manual parking time is shorter than the automatic parking time, it may be determined that it is in the situation to perform the manual parking, and if the manual parking time is longer than the automatic parking time, it may be determined that it is in the situation to perform the automated valet parking. The parking operation determinator 150 is a specific example of the "determinator" in Supplementary Notes described later.

The parking operation determinator 150 may determine the parking operation in view of an automatic parking desired degree, which indicates an extent that the occupant of the vehicle 10 prioritizes automatic parking. Specifically, if the automatic parking desired degree is high (i.e., if the occupant strongly wants the automated valet parking), it may be determined that the automated valet parking is to be performed even if the manual parking time is slightly shorter than the automatic parking time. To make such a determination, the parking operation determinator 150 may subtract a time corresponding to the automatic parking desired degree from the automatic parking time calculated by the first time calculator 130, or may add the time corresponding to the automatic parking desired degree to the manual parking time calculated by the second time calculator 140. Alternatively, the parking operation determinator 150 may use a weighting factor corresponding to the time corresponding to the automatic parking desired degree, thereby adjusting at least one of the automatic parking time and the manual parking time.

A determination result of the parking operation determinator 150 may be outputted to the user HMI 110. By this, the determination result of the parking operation determinator 150 (i.e., which of the automated valet parking and the manual parking is to be performed) may be presented (or proposed) to the occupant of the vehicle 10 by audio, video, or the like.

The automatic parking management apparatus 20 is a management apparatus provided in a parking lot that allows the automatic parking, and is configured to manage various information about the automated valet parking and to execute an instruction to perform the automated valet parking (i.e., a moving control of the vehicle 10 that is about to automatically park) or the like. The automatic parking management apparatus 20 is provided with the communicator 210, an automatic parking instruction unit 220, and a congestion monitor 230, as processing blocks or physical processing circuits for realizing its function.

The communicator 210 is configured to input/output various information by wirelessly communicating with the vehicle 10 (i.e., the communicator 120). The communicator 210 is configured to output information that is used when the automatic parking time and the manual parking time are calculated (e.g., a "congestion degree" calculated by the congestion monitor 230), to the vehicle 10.

The automatic parking instruction unit 220 is configured to output a moving instruction (i.e., a driving instruction), to the vehicle 10 in the parking lot, thereby performing the automated valet parking. For example, the automatic parking instruction unit 220 may instruct the vehicle 10 located in a predetermined start position, to move to an available parking space. A detailed explanation of more specific control content of the automated valet parking will be omitted herein because the existing technologies/techniques can be applied, as occasion demands.

The congestion monitor 230 is configured to monitor a congestion state in the parking lot. More specifically, the congestion monitor 230 is configured to calculate the congestion degree in the parking lot. The "congestion degree" herein may be a parameter indicating a degree of congestion of the vehicle 10 in the parking lot. Typically, as the number of the vehicles 10 that are in the parking lot increases, the congestion degree becomes higher. The congestion degree may also increase in accordance with a state of progress of the automated valet parking, or the like. Specifically, the congestion degree may increase if there are many vehicles 10 that are performing the automated valet parking, or many vehicles 10 that wait for the start of the automated valet parking. The congestion monitor 230 is configured to calculated the congestion degree, for example, by obtaining information about the state of progress of the automated valet parking from the automatic parking instruction unit 220, or by obtaining information about the vehicle 10 in the parking lot from a sensor, such as a camera, provided in the parking lot.

The automatic parking management apparatus 20 may be designed to have a part of the functions of the parts of the vehicle 10 described above. In the same manner, the vehicle 10 may be designed to have a part of the functions of the parts of the automatic parking management apparatus 20 described above. Moreover, regarding a part of the functions of the parts of the vehicle 10 and the automatic parking management apparatus 20, another apparatus (e.g., a server, etc.) that can communicate with them may be designed to have it.

<Example of Parking Lot>

Figure 2:
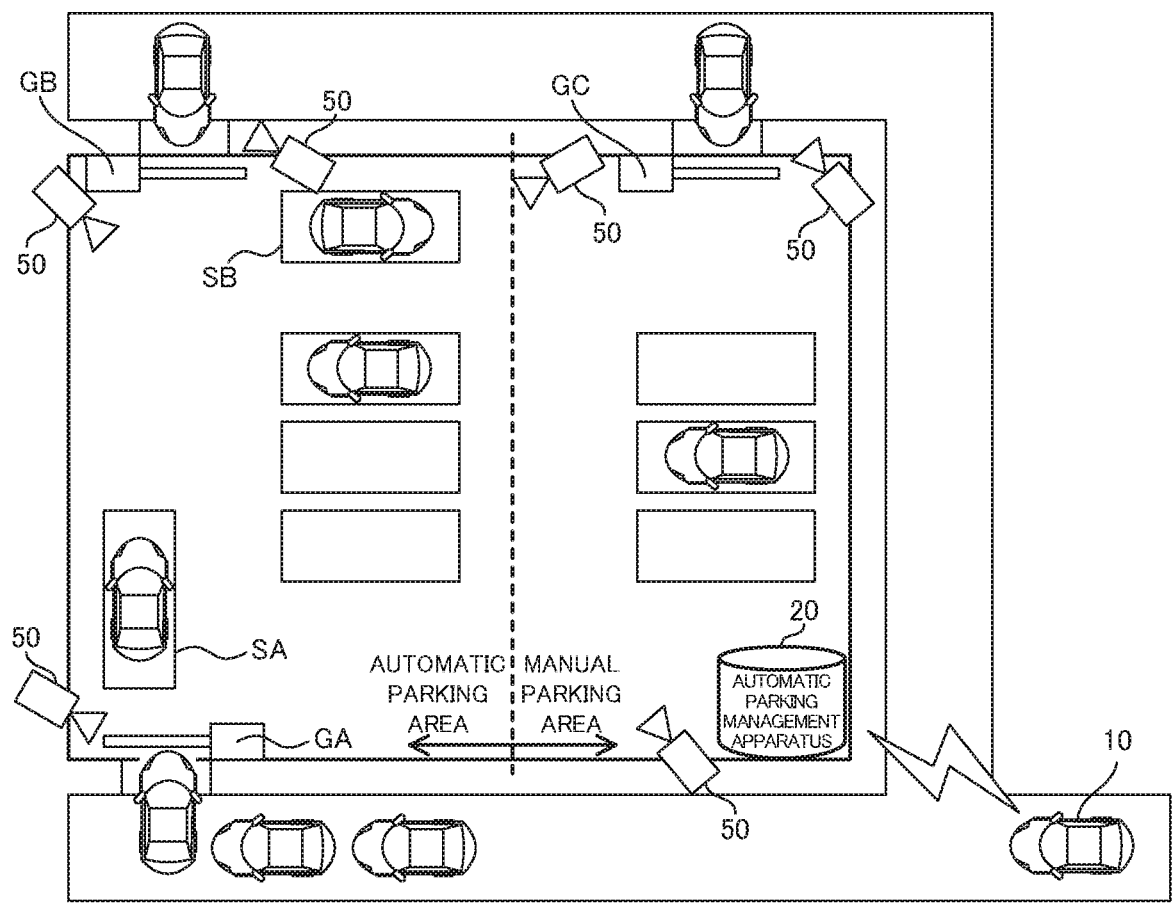
FIG. 2 is a plan view illustrating an integrated parking lot including both an automatic parking space and a manual parking space.
Figure 3:
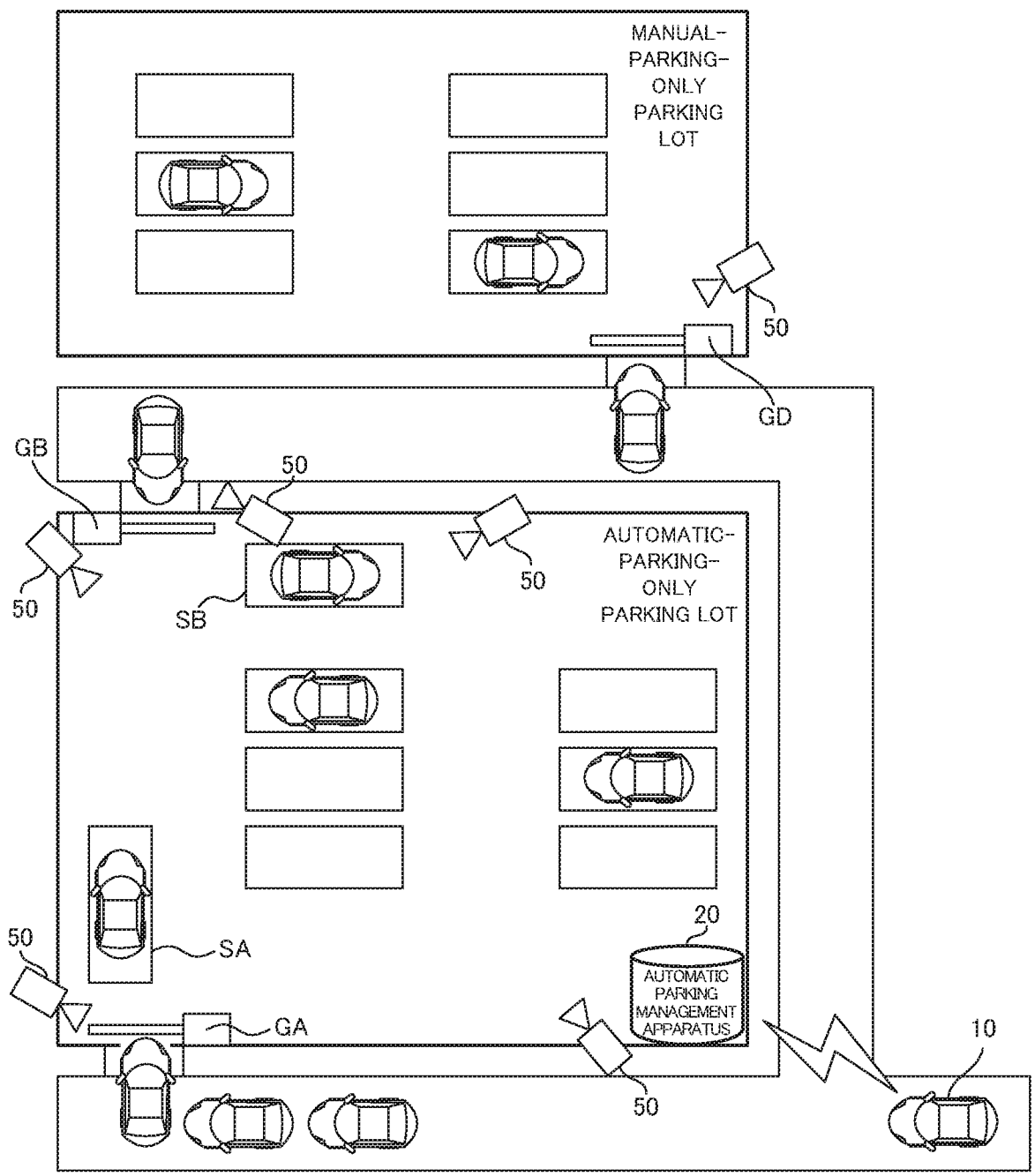
FIG. 3 is a plan view illustrating an automatic-parking-only parking lot and a manual-parking-only parking lot.

Next, with reference to FIG. 2 and FIG. 3, an explanation will be given to the parking lot to which the parking assist system according to the embodiment is applied. FIG. 2 is a plan view illustrating an integrated parking lot including both an automatic parking space and a manual parking space. FIG. 3 is a plan view illustrating an automatic-parking-only parking lot and a manual-parking-only parking lot.

The parking lot illustrated in FIG. 2 is divided into an "automatic parking area (i.e., an area on the left side of a dashed line in FIG. 2)" including a parking space for the automated valet parking only, and a "manual parking area (i.e., an area on the right side of the dashed line in FIG. 2)" including a parking space for the manual parking only. The parking lot is provided with a plurality of sensors 50, such as cameras, for monitoring the state of the vehicles 10 that are in the parking lot or near an entrance.

A gate GA (i.e., a gate on the lower left of FIG. 2) and a gate GB (i.e., a gate on the upper left of FIG. 2) are gates for the vehicle 10 that is supposed to perform the automated valet parking, to enter or leave therefrom. The vehicle 10 that enters from the gate GA is guided from there to an automated valet parking start position SA (hereinafter referred to as a "start position SA" as occasion demands). In the same manner, the vehicle 10 that enters from the gate GB is guided from there to an automated valet parking start position SB (hereinafter referred to as a "start position SB" as occasion demands). The vehicles 10 that are stopped in the start positions SA and SB are automatically parked in available parking spaces in the automatic parking area as soon as the occupants get off the vehicles 10 and the automated valet parking is prepared.

On the other hand, a gate GC (i.e., a gate on the upper right of FIG. 2) is a gate for the vehicle 10 that is supposed to perform the manual parking, to enter or leave therefrom. The vehicle 10 that enters from the gate GC goes from there and is parked manually (i.e., by a driver's operation) in an available parking space in the manual parking area.

In the parking lot illustrated in FIG. 2, there are two types of areas, which are the automatic parking area and the manual parking area, but there may be also provided an automatic parking/manual parking mix area in which the vehicle 10 can be parked by both the automated valet parking and the manual parking.

In an example illustrated in FIG. 3, the "automatic-parking-only parking lot" only including a parking space for the automated valet parking only and the "manual-parking-only parking lot" only including a parking space for the manual parking only are independently provided. Thus, the vehicle 10 that is supposed to perform the automated valet parking enters the automatic-parking-only parking lot from the gate GA or GB. The vehicle 10 that is supposed to perform the manual parking enters the manual-parking-only parking lot from a gate GD.

As described above, the parking assist system according to the embodiment is applied to the parking lot including both the parking space that allows the automated valet parking and the parking space that allows the manual parking. In this case, as illustrated in FIG. 2, one parking lot may be provided with the automatic parking area and the manual parking area, or as illustrated in FIG. 3, the automatic-parking-only parking lot and the manual-parking-only parking lot may be provided as different parking lots. In other words, the parking assist system according to the embodiment can be applied in an environment in which the occupant of the vehicle 10 can select whether to perform the automated valet parking or the manual parking.

<Explanation of Operation>

Figure 4:
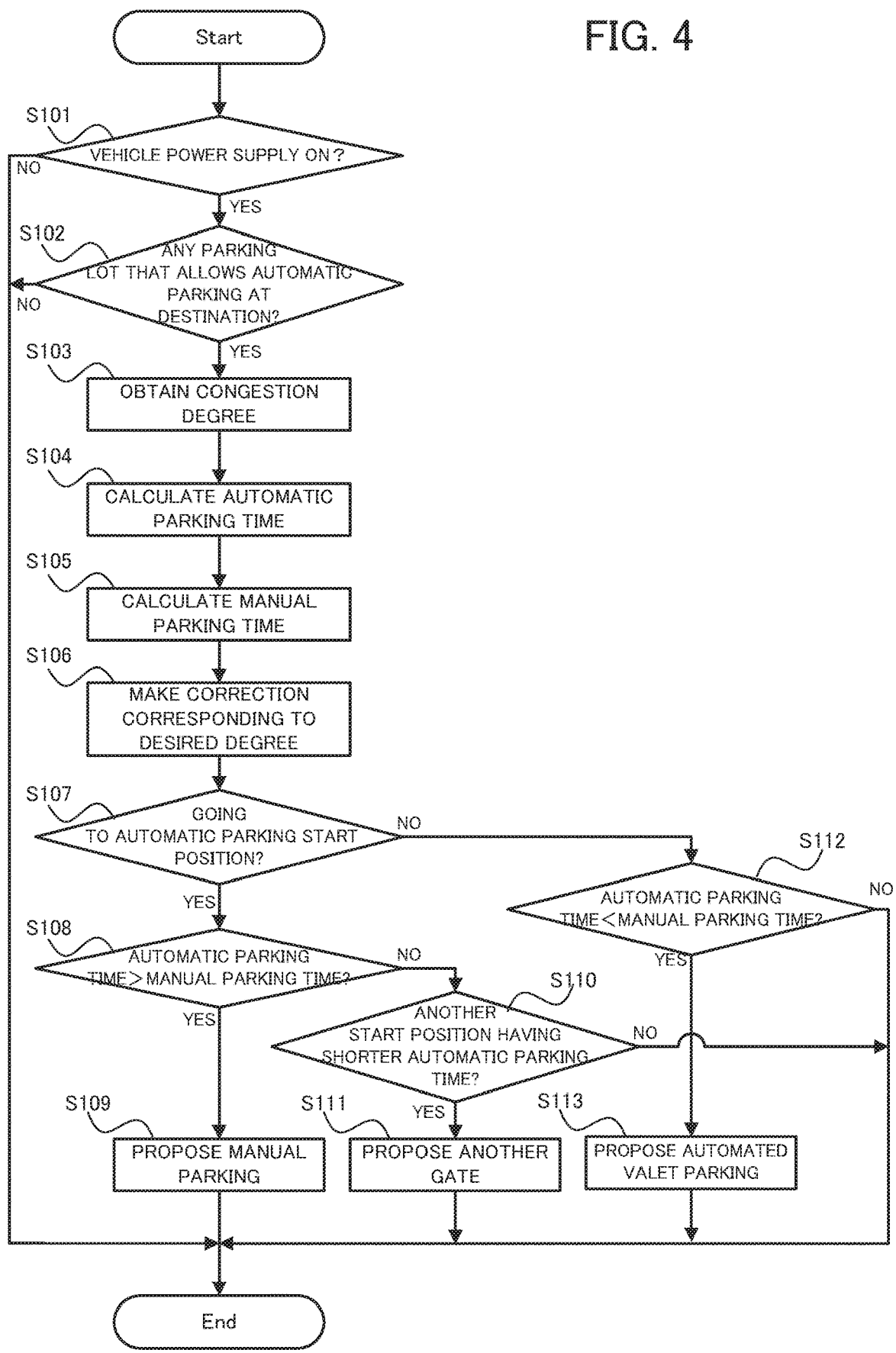
FIG. 4 is a flowchart illustrating a flow of operations of the parking assist system according to the embodiment.

Next, a flow of operations of the parking assist system according to the embodiment will be explained with reference to FIG. 4. FIG. 4 is a flowchart illustrating the flow of the operations of the parking assist system according to the embodiment. It is noted that each of the following process operations is performed on the vehicle 10 side illustrated in FIG. 1.

As illustrated in FIG. 4, in operation of the parking assist system according to the embodiment, firstly, the parking operation determinator 150 determines whether or not a power supply of the vehicle 10 is ON (step S101). If it is determined that the power supply of the vehicle 10 is not ON (i.e., it is OFF) (the step S101: NO), the subsequent process is omitted, and a series of operations is ended. In this case, after a lapse of a predetermined period, the step S101 is started again.

If it is determined that the power supply of the vehicle 10 is ON (the step S101: YES), the parking operation determinator 150 determines whether or not there is a parking lot that allows the automated valet parking at the destination of the vehicle 10 (step S102). The determination may be performed, for example, by obtaining destination information from a navigation system of the vehicle 10. Alternatively, a facility the occupant of the vehicle 10 supposedly goes to may be predicted from the schedule information about the occupant, and it may be determined whether or not there is a parking lot that allows the automated valet parking around the facility. If it is determined that there is no parking lot that allows the automated valet parking at the destination (the step S102: NO), the subsequent process is omitted, and a series of operations is ended.

If it is determined that there is the parking lot that allows the automated valet parking at the destination (the step S102: YES), the communicator 120 obtains the congestion degree in the parking lot (i.e., the parking lot in which the automated valet parking is possibly performed) from the automatic parking management apparatus 20 (step S103). In other words, the communicator 120 herein may function as a specific example of the "second acquirer" in Supplementary Notes described later.

The first time calculator 130 then calculates the automatic parking time in view of the obtained congestion degree (step S104). For example, the first time calculator 130 may calculate a provisional value of the automatic parking time by using a distance from the current position of the vehicle 10 to the automated valet parking start position, the speed of the vehicle 10, or the like, and may correct the calculated value to be longer with increasing congestion degree, thereby calculating the final automatic parking time. As illustrated in FIG. 2 and FIG. 3, if there are two gates for the automated valet parking (i.e., the different gates GA and GB), the automatic parking times may be separately calculated for the use of the respective gates. In other words, if there are two automated valet parking start positions (i.e., the different start positions SA and SB), the automatic parking times, which are times for respectively moving the vehicle 10 to the start positions SA and SB, may be calculated separately.

The second time calculator 140 then calculates the manual parking time, which is a time when the vehicle 10 is manually parked in the manual parking area in the parking lot (e.g., refer to FIG. 2) or another parking lot (refer to FIG. 3) (step S105). If there are a plurality of parking lot candidates or area candidates, which are targets of the manual parking, then, the manual parking times may be separately calculated for the candidates, and the shortest one of the calculated times may be used in the subsequent process.

The parking operation determinator 150 then makes a correction corresponding to the automatic parking desired degree, on the calculated automatic parking time and the calculated manual parking time (step S106). For the automatic parking desired degree, a value inputted by the occupant of the vehicle 10 using the user HMI may be used. Alternatively, which of the automated valet parking and the manual parking is preferred may be analyzed by using information about a past driving history of the occupant of the vehicle 10, and a value automatically determined on the basis of an analysis result may be used. Alternatively, if a parking fee is cheaper when the manual parking is selected than when the automated valet parking is selected, then, the automatic parking desired degree may be automatically reduced. If the automatic parking desired degree is not set, the step S106 may be omitted.

If the automatic parking desired degree is a relatively high value (i.e., if the occupant wants the automated valet parking), the correction may be made to reduce the calculated automatic parking time and/or to increase the calculated manual parking time. In addition to or instead of the correction made when the automatic parking desired degree is a relatively high value, if the automatic parking desired degree is a relatively low value (i.e., the occupant does not want the automated valet parking), the correction may be made to increase the calculated automatic parking time and/or to reduce the calculated manual parking time.

The parking operation determinator 150 then determines whether or not the vehicle 10 is going to the automated valet parking start position (corresponding to the "start positions SA and SB" in FIG. 2 and FIG. 3) (step S107). In other words, the parking operation determinator 150 determines whether the occupant of the vehicle 10 is about to perform the automated valet parking or the manual parking at a current time point. In the determination, if there are both possibilities that the vehicle 10 is going to the automated valet parking and that the occupant of the vehicle 10 is about to perform the manual parking, then, for example, it may be provisionally determined that the vehicle 10 is going to the automated valet parking, or the determination may be made in view of the automatic parking desired degree described above.

If the vehicle 10 is going to the automated valet parking start position (the step S107: YES), it can be determined that the occupant of the vehicle 10 is about to perform the automated valet parking at the current time point. In this case, the parking operation determinator 150 determines whether or not the automatic parking time corresponding to the automated valet parking start position the vehicle 10 is now going to is longer than the manual parking time (step S108).

If it is determined that the automatic parking time is longer than the manual parking time (the step S108: YES), it takes more time to perform the automated valet parking than performing the manual parking. It can be thus determined that it is a situation to select the manual parking than the automated valet parking. The parking operation determinator 150 thus proposes the manual parking to the occupant of the vehicle 10 via the user HMI 110 (step S109). The proposal content in this case may include a difference between the automatic parking time and the manual parking time (i.e., a time that can be reduced by selecting the manual parking), or position information about a manual-parking-only area or the manual-parking-only parking lot.

On the other hand, if it is determined that the automatic parking time is not longer than the manual parking time (the step S108: NO), it does not take more time to perform the automated valet parking than performing the manual parking. It can be thus determined that it is a situation to select the automated valet parking than the manual parking. In this case, the parking operation determinator 150 determines whether or not there is another automated valet parking start position (or gate) that requires a shorter automatic parking time than that of the automated valet parking start position the vehicle 10 is now going to, in the parking lot in which the automatic parking management apparatus 20 is provided (step S110). If there is no automated valet parking start position other than the automated valet parking start position the vehicle 10 is now going to, the determination in the step S110 may not be performed.

If it is determined that there is another automated valet parking start position that requires a shorter automatic parking time (the step S110: YES), it can be determined that it is a situation to select the other automated valet parking start position rather than the automated valet parking start position the vehicle 10 is going to. The parking operation determinator 150 thus proposes the automated valet parking from the other automated valet parking start position, to the occupant of the vehicle 10 via the user HMI 110 (step S111). The proposal content in this case may include a difference between the automatic parking time corresponding to the automated valet parking start position the vehicle 10 is going to and the automatic parking time corresponding to the other automated valet parking start position (i.e., a time that can be reduced by selecting the other automated valet parking start position), or position information about another start position or another gate.

If it is determined that there is no other automated valet parking start position that requires a shorter automatic parking time (the step S110: NO), it can be determined that it is the situation to perform the automated valet parking from the automated valet parking start position the vehicle 10 is going to. Thus, the proposal about the manual parking and the proposal about the other automated valet parking start position described above are not performed.

On the other hand, if the vehicle 10 is not going to the automated valet parking start position (the step S107: NO), it can be determined that the occupant of the vehicle 10 is about to perform the manual parking at the current time point. In this case, the parking operation determinator 150 determines whether or not the automatic parking time is shorter than the manual parking time (step S112).

If it is determined that the automatic parking time is shorter than the manual parking time (the step S112: YES), the time can be reduced more by performing the automated valet parking, than by performing the manual parking. In other words, it can be determined that it is the situation to select the automated valet parking than the manual parking. The parking operation determinator 150 thus proposes the automated valet parking to the occupant of the vehicle 10 via the user HMI 110 (step S113). The proposal content in this case may include a difference between the automatic parking time and the manual parking time (i.e., a time that can be reduced by selecting the automated valet parking), or position information about a automatic-parking-only area or the automatic-parking-only parking lot.

If it is determined that the automatic parking time is longer than the manual parking time (the step S112: NO), it can be determined that it is in the situation to perform the manual parking. Thus, the proposal about the automated valet parking described above is not performed.

<Technical Effect>

Next, a technical effect obtained by the parking assist system according to the embodiment will be explained.

As illustrated in FIG. 1 to FIG. 4, in the parking assist system according to the embodiment, the "automatic parking time" required in selecting the automated valet parking is compared with the "manual parking time" required in selecting the manual parking, by which a more appropriate parking operation is proposed to the occupant of the vehicle 10. It is thus possible to improve convenience when the vehicle 10 is parked.

Regarding a time required before the start of the automated valet parking, which corresponds to the automatic parking time, one may think that the occupant himself can make a determination by visually observing the number of other vehicles that get in line near the gate (i.e., the number of the vehicles that wait their turns) from outside the parking lot. The time required before the start of the automated valet parking, however, depends significantly on the congestion state in the parking lot. It is thus very difficult to determine the length of the time required before the start of the automated valet parking, by the visual observation from outside the parking lot.

In contrast, as in the embodiment, if the congestion degree, which is a parameter indicating the congestion state in the parking lot, is obtained from the automatic parking management apparatus 20, it is possible to calculate the automatic parking time with high accuracy. In the parking assist system according to the embodiment, the automatic parking time and the manual parking time are compared by the parking operation determinator 150, and (i) the manual parking is proposed if the manual parking time is determined to be shorter than the automatic parking time when the vehicle 10 is going to the automated valet parking start position, and (ii) the automated valet parking is proposed if the automatic parking time is determined to be shorter than the manual parking time when the occupant of the vehicle 10 is about to perform the manual parking. Thus, according to the parking assist system in the embodiment, it is possible to more appropriately determine whether the occupant of the vehicle 10 should select the automated valet parking or the manual parking. In other words, according to the parking assist system, it is possible to allow the occupant of the vehicle 10 to select an appropriate parking operation.

<Supplementary Notes>

Various aspects of embodiments of the present disclosure derived from the embodiment explained above will be explained hereinafter.

(Supplementary Note 1)

A parking assist system described in Supplementary Note 1 is a parking assist system configured to perform a parking control for automatically parking a vehicle, the parking assist system provided with: a first estimator configured to estimate a first time, which is a time required for a parking control preliminary operation of manually moving the vehicle to a position in one parking lot in which the parking control can be started; a second estimator configured to estimate a second time, which is a time required for a manual parking operation of manually parking the vehicle in a parking space in the one parking lot or in another parking lot, without allowing the parking control to be performed; a determinator configured to determine whether or not it is in a situation to perform the manual parking operation rather than the parking control preliminary operation, on the basis of the first time and the second time; and a proposing device configured to propose performing the manual parking operation to an occupant of the vehicle if it is determined that it is in the situation to perform the manual parking operation rather than the parking control preliminary operation.

According to the parking assist system described in Supplementary Note 1, it is possible to determine whether or not it is in the situation to perform the manual parking operation rather than the parking control preliminary operation, by using the first time, which is the time required for the parking control preliminary operation, and the second time, which is the time required for the manual parking operation. It is thus possible to propose the manual parking operation to the occupant of the vehicle in accordance with situations. By this, the occupant of the vehicle can select an appropriate operation from the parking control preliminary operation and the manual parking operation.

(Supplementary Note 2)

In a parking assist system described in Supplementary Note 2, the first time includes a time required for the occupant of the vehicle to move to a predetermined destination from a location in which the occupant ends the parking control preliminary operation, in addition to the time required for the parking control preliminary operation, and the second time includes a time required for the occupant of the vehicle to move to the predetermined destination from a location in which the occupant ends the manual parking operation, in addition to the time required for the manual parking operation.

According to the parking assist system described in Supplementary Note 2, the time to move to the predetermined destination from the location in which the parking control preliminary operation or the manual parking operation is ended is considered. It is thus possible to make more appropriate determination about whether or not it is in the situation to perform the manual parking operation rather than the parking control preliminary operation.

(Supplementary Note 3)

A parking assist system described in Supplementary Note 3 is further provided with a first acquirer configured to obtain a parking control desired degree, which indicates an extent that the occupant of the vehicle wants to perform the parking control, wherein at least one estimator of the first estimator and the second estimator is configured to correct a time corresponding to the at least one estimator, out of the first time and the second time, on the basis of the parking control desired degree.

According to the parking assist system described in Supplementary Note 3, at least one of the first time and the second time is corrected on the basis of the parking control desired degree. It is thus possible to make more appropriate determination about whether or not it is in the situation to perform the manual parking operation rather than the parking control preliminary operation.

(Supplementary Note 4)

A parking assist system described in Supplementary Note 4 is further provided with a second acquirer configured to obtain a congestion degree in the one parking lot, wherein the first estimator is configured to estimate the first time on the basis of the congestion degree.

According to the parking assist system described in Supplementary Note 4, it is possible to accurately estimate the first time by using the congestion degree in the parking lot.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A parking assist system configured to perform an automatic parking control for automatically parking a vehicle, said parking assist system comprising:
   at least one processing circuit configured to:
   estimate a first time, which is a time required for a parking control preliminary operation of manually moving the vehicle to a position in one parking lot in which the automatic parking control can be started;
   estimate a second time, which is a time required for a manual parking operation of manually parking the vehicle in a parking space in the one parking lot or in another parking lot, without allowing the automatic parking control to be performed;
   obtain a parking control desired degree, which indicates an extent that the occupant of the vehicle wants to perform the parking control;
   correct a time, out of the first time and the second time, on the basis of the parking control desired degree;
   determine whether the vehicle is in a situation to perform the manual parking operation rather than the parking control preliminary operation, on the basis of the first time and the second time;
   propose performing the manual parking operation to an occupant of the vehicle based upon the determination the vehicle is in the situation to perform the manual parking operation rather than the parking control preliminary operation; and
   perform the automatic parking control based upon the determination the vehicle is in the situation to perform the parking control preliminary operation rather than the manual parking operation.

2. The parking assist system according to claim 1, wherein the first time includes a time required for the occupant of the vehicle to move to a predetermined destination from a location in which the occupant ends the parking control preliminary operation, in addition to the time required for the parking control preliminary operation, and
   the second time includes a time required for the occupant of the vehicle to move to the predetermined destination from a location in which the occupant ends the manual parking operation, in addition to the time required for the manual parking operation.

3. The parking assist system according to claim 2, wherein the at least one processing circuit is configured to determine that the vehicle is in the situation to perform the manual parking operation rather than the parking control preliminary operation, when the first time exceeds the second time.

4. The parking assist system according to claim 1, wherein the at least one processing circuit is further configured to:
   obtain a congestion degree in the one parking lot; and
   estimate the first time on the basis of the congestion degree.

* * * * *